A. B. PACE.
SEED PLANTER.
APPLICATION FILED NOV. 28, 1913.
1,113,242.
Patented Oct. 13, 1914.
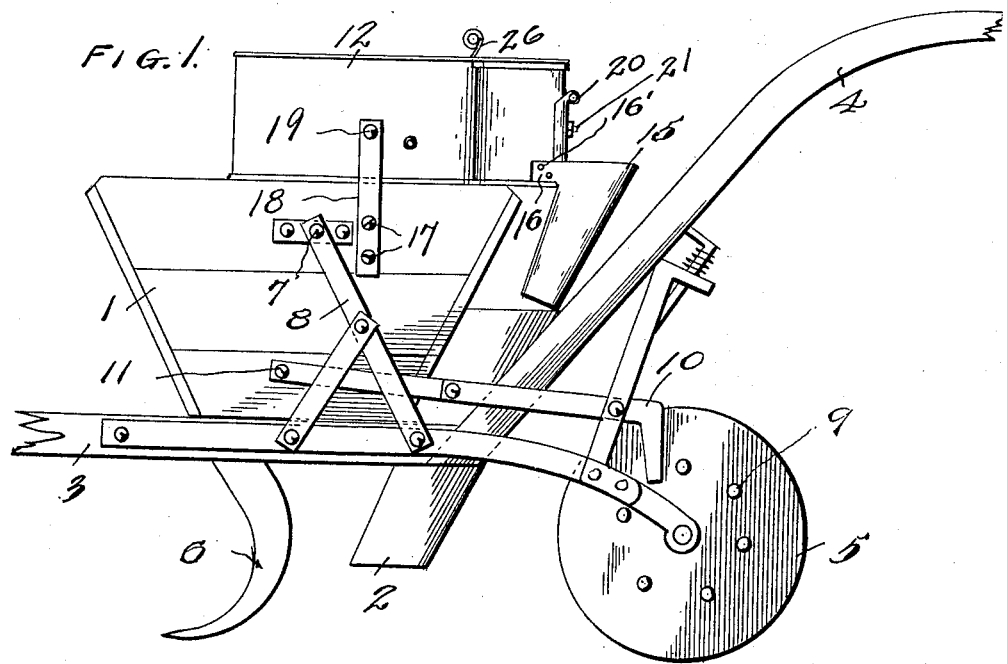
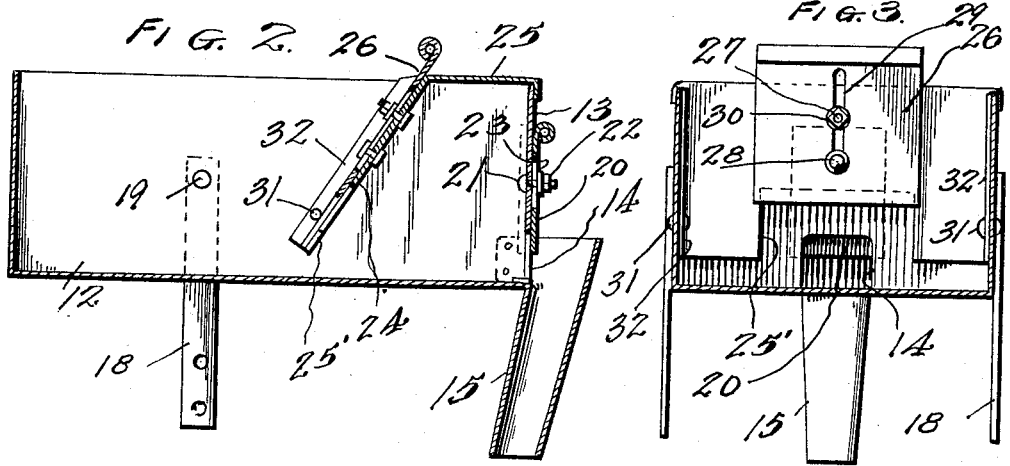
WITNESSES.
C. K. Davis
M. L. Newcomb
INVENTOR
ALVA B. PACE
By Herman A. Phillips
Attorney.

UNITED STATES PATENT OFFICE.

ALVA B. PACE, OF CARROLLTON, GEORGIA.

SEED-PLANTER.

1,113,242.  Specification of Letters Patent.  Patented Oct. 13, 1914.

Application filed November 28, 1913. Serial No. 803,544.

*To all whom it may concern:*

Be it known that I, ALVA B. PACE, a citizen of the United States, residing at Carrollton, in the county of Carroll and State of Georgia, have invented certain new and useful Improvements in Seed-Planters, of which the following is a specification.

The present invention relates to improvements in seed planters, and is particularly ædesigned for use in connection with fertilizer distributers.

The primary object of the invention is the provision of a detachable device, to be attached to a fertilizer distributer and adapted to distribute seeds in connection with the distribution of fertilizing material.

The device is applicable especially with that type of fertilizer distributers known as "hopper knocking" distributers which are actuated or agitated by suitable means.

The invention consists especially in an attachment to be used in connection with the hopper of a fertilizer distributer, by means of which the fertilizing material and seeds may be distributed, as hereinafter set forth, and particularly described in the appended claims.

In the accompanying drawings I have illustrated one complete example of the physical embodiment of my invention constructed according to the best mode I have so far devised for the practical application of the principles.

Figure 1 illustrates so much of a fertilizer distributer of the "hopper knocking" type, as is necessary to show the adaptation of my invention thereto. Fig. 2 is a longitudinal, vertical sectional view of the seed planter, Fig. 3 is a transverse sectional view through the hopper for the seeds, showing the means for adjusting the outlet of the seeds from the hopper box.

In the drawings, and particularly Fig. 1, I have illustrated the device in use in the preferred embodiment of my invention, wherein I employ a fertilizer distributer which comprises an oscillatable hopper 1 adapted to certain fertilizing material from which the material is distributed through the spout 2. The hopper is supported above the beam 3, and the handles 4 are adapted to guide the implement as it is drawn over the ground supported on the solid wooden wheel 5. The plow or furrow opener 6 may be of usual type and supported in suitable manner from the implement, and the hopper 1, which is pivoted at 7, in the side frame 8, is oscillated from the rotating wheel 5. The wheel 5 is provided with the usual series of spikes or pins 9 which are adapted to contact with and move the lever 10 which is pivoted at 11 to the hopper, and by the rotation of the wheel 5 the hopper is oscillated through the connecting lever 10, as will be understood.

The implement thus far described is of usual or well known type, and as will be readily understood, the fertilizing material is distributed from the spout 2 as the hopper 1 is oscillated on its pivot 7.

In connection with the oscillatable hopper for the fertilizer, I combine my improved seed box and seed feeding device. The improved seed box is preferably of metal and comprises the open box 12 having a rear wall 13 and a rear opening 14 in the wall 13 about which the upper end of the spout 15 extends.

In Fig. 1 it will be seen that the spout 15 is located directly above the upper open end of the spout 2, so that seeds may pass from the spout 15 into the spout 2, as will be described. The spout 15 is secured by means of its flanges 16 and rivets 16', to the lower rear end of the box 12, and the box itself is secured to the hopper 1, by means of screws 17 which are passed through the metallic strap 18, the latter being pivoted at 19 to the box 12. There are two of these straps 18, one at each side of the box, and through their instrumentality the box 12 is rigidly and securely held on the top of the hopper 1.

The area of the opening 14 to the spout 15 is regulated by means of a slide plate 20 which is adjustably attached at the outer side of the end wall 13 by means of the bolt 21 and nut 22, and the plate 20 may be raised or lowered through the presence of the slot 23 in the slide plate 20.

Within the box 12 I arrange a transversely extending inclined partition 24. This partition is provided with a plate 25 which extends horizontally and covers the upper rear end of the box 12. At 25 the partition 24 is cut away to form an opening extending partly across the partition, as seen clearly in Fig. 3, and as seen in Figs. 2 and 3, it will be noted that the partition does not reach to the bottom of the box, but leaves a space thereunder extending the width of the box.

The area of the space 25 is governed by a slide plate or gate 26 which is adjustably secured to the partition by means of the bolt 27, and rivet 28. The bolt and rivet pass through a slot 29 in the plate 26, and the rivet 28 is provided with a loose fit so that when the nut 30 on the bolt 27 is loosened, the plate may be moved up or down, and when secured in desired position it may be held there by tightening the nut 30 on the bolt 27.

The operation of the implement will be apparent from an inspection of the drawings, and it will be noted that as the implement passes over the ground the rotation of the wheel 5 oscillates the hopper 1, and inasmuch as the seed box 12 containing suitable seeds is oscillatable with the hopper 1, it will be apparent that the seeds are shaken from the seed box through the spout 15 and into the spout 2 where the seeds mingle with the fertilizer and fall into the furrow to the rear of the plow 6. The slide gate 26 is provided in order to prevent the passage of an excessive quantity of seeds from the forward part of the box 12 to the rear part thereof, thus preventing clogging of the opening 14 in the rear of the box, and the slide gate 20 regulates the supply of seeds through the opening 14 and into the spout 15. By this means it will be seen that the quantity of seeds to be distributed with the fertilizing material may be determined and governed to conform to different circumstances and requirements. The seed box may be quickly attached to or detached from the hopper 1 by means of the screws 17, and it will be noted that the seed box may be located in desired position on the hopper and supported and attached thereto by means of the straps 18. The partition 24 is attached to the inside of the seed box by means of rivets 31 which are passed through the end flanges 32 of the partition. These rivets 31 provide a loose joint between the box and flanges so that the partition may be swung on them as pivots, and when it is necessary to move the partition to gain access to the box under the partition, this may be accomplished by swinging the partition on its pivots 31 toward the front of the box thus opening the rear of the box by lifting the plate 25 of the partition. This is especially desirable when it is necessary to remove any extraneous substance or material from the feed part of the seed box.

From the above description taken in connection with my drawings it will be apparent that I have provided an attachment for fertilizer distributers which is capable of performing the functions of a comparatively perfect device of this character, and adapted to be actuated in combination with an oscillatable hopper for distributing fertilizing material, as previously set forth.

Having thus fully described my invention, what I claim as new and desire to secure by Letters Patent, is:—

1. The combination in a seed box having an outlet, a spout, and an adjustable gate for the outlet, of a pivoted inclined partition located in the box and having an opening above the box bottom, a plate formed integral with the partition and engaging the box top as a support, and an adjustable gate for regulating the area of the partition opening.

2. The combination with an oscillatable hopper and its spout, of a seed box having a feed space and opening and a spout located directly above the hopper spout, a movable inclined partition having an adjustable opening therein and extending across said box, and having a top portion over the feed space, and a slotted gate with adjusting means for regulating the area of the feed opening.

In testimony whereof I affix my signature in presence of two witnesses.

ALVA B. PACE.

Witnesses:
H. NEWTON SPENCE,
CHEADLE B. LASSETTER.

Copies of this patent may be obtained for five cents each, by addressing the "Commissioner of Patents, Washington, D. C."